(12) United States Patent
Chang et al.

(10) Patent No.: US 8,177,682 B2
(45) Date of Patent: May 15, 2012

(54) APPARATUS FOR IMPROVING VEHICLE FUEL EFFICIENCY

(76) Inventors: Ten-Lee Chang, Taipei (TW); Tien-Li Chen, Taipei (TW)

( * ) Notice: Subject to any disclaimer, the term of this patent is extended or adjusted under 35 U.S.C. 154(b) by 407 days.

(21) Appl. No.: 12/479,241

(22) Filed: Jun. 5, 2009

(65) Prior Publication Data
US 2010/0311543 A1    Dec. 9, 2010

(51) Int. Cl.
| | |
|---|---|
| B60W 10/02 | (2006.01) |
| B60W 10/04 | (2006.01) |
| H02P 15/00 | (2006.01) |
| B60K 17/28 | (2006.01) |
| B60K 25/00 | (2006.01) |
| B60H 1/32 | (2006.01) |

(52) U.S. Cl. .................. 477/6; 477/8; 180/53.8; 62/243; 62/244

(58) Field of Classification Search .................. 477/6, 8, 477/115; 180/53.8; 62/236, 244, 243
See application file for complete search history.

(56) References Cited

U.S. PATENT DOCUMENTS

| | | | | |
|---|---|---|---|---|
| 2,378,063 | A | * | 6/1945 | Clark et al. ................... 62/208 |
| 3,646,773 | A | * | 3/1972 | Falk et al. ..................... 62/160 |
| 5,635,805 | A | * | 6/1997 | Ibaraki et al. ................ 318/139 |
| 2008/0314059 | A1 | * | 12/2008 | Harkness et al. ............. 62/236 |
| 2009/0107739 | A1 | * | 4/2009 | Major et al. ................. 180/53.8 |

FOREIGN PATENT DOCUMENTS

FR    2816651 A1  *  5/2002

\* cited by examiner

*Primary Examiner* — Tisha Lewis
(74) *Attorney, Agent, or Firm* — Muncy, Geissler, Olds & Lowe, PLLC (57) ABSTRACT

An apparatus for improving fuel efficiency of a vehicle is provided, including an engine, a generator system and an air-conditioning system. The generator system and the air-conditioning system are connected respectively through transmission elements and a moveable first active transmission wheel and a second active transmission wheel on the engine core axis. A first clutch is placed between the crank shaft of the engine and the first active transmission wheel, and a second clutch is placed between the first active transmission wheel and the second active transmission wheel. Also, a control circuit is provided to control the operation of the first clutch and the second clutch, in order to control the driving and rotation of the first active transmission wheel and/or the second active transmission wheel. The control circuit further determines according to the signal whether power is provided directly to the generator system and further drives the air-conditioning system.

16 Claims, 9 Drawing Sheets

APPARATUS FOR IMPROVING VEHICLE FUEL EFFICIENCY

BACKGROUND OF THE INVENTION

1. Field of the Invention

The present invention generally relates to an apparatus for improving the fuel efficiency of conventional gasoline and diesel engines used in transportation vehicles, and more specifically to an energy-saving apparatus for reducing the idling of the belt driving systems of the engine during driving and reducing the idling fuel consumption during traffic.

2. The Prior Arts

The rapid development of automobile industry in recent years has greatly shortened the commuting time. However, the carbon-dioxide from the use of the gasoline has led to the global warming and poor air quality. It is estimated that only about 30% of the fuel used by the car engine is for moving the car, while the remaining 70% is transformed into heat, and wasted through the heat dissipation system and the exhaustion system. Facing the increasing pressure of the global warming and the pending shortage of oil supply, it is imperative to revise the technology and the use habit to improve the fuel efficiency, especially for the auto industry. According to a report from Discovery Channel, the oil consumption in USA is about ¼ of the global consumption, and 55% of that amount is consumed by the 230 million cars. Based on that ratio, it is roughly estimated that about half of oil is used by cars. The dependence on the fuel and the impact on the environment caused by vehicles are threatening.

However, the new models based on the new fuel technology, such as, electrical-gas hybrid cars, make up a very small share in the market. The conventional gas/diesel engine cars are still the mainstream of the automobile industry. Therefore, the overall energy consumption by the cars still leaves large room for improvement.

Figure 1:
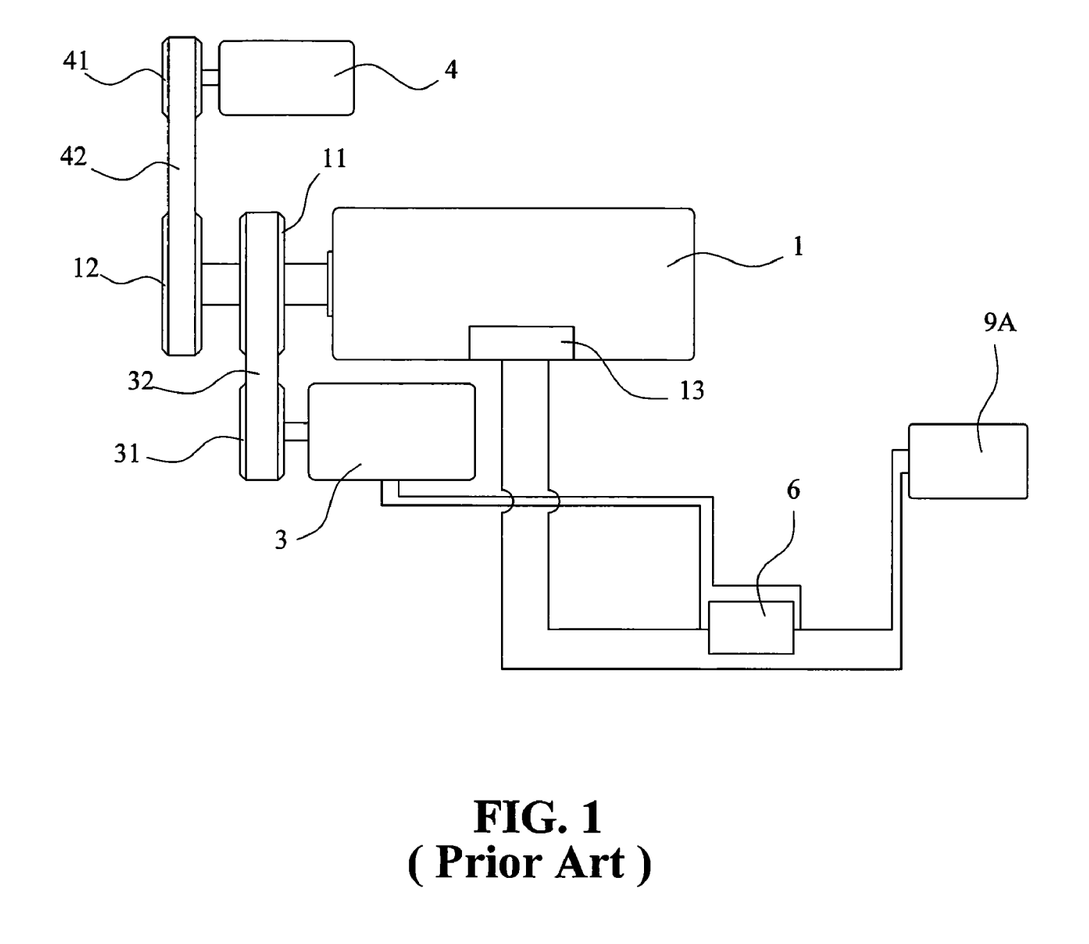
FIG. 1 shows a schematic view of a conventional driving apparatus for vehicles.

One of the reasons that the conventional engine consumes so much fuel is that the engine is still rotating when the car is idling. The car may be idle for a few seconds to a few minutes, or even longer. If the engine is turned off, the car must be shifted to N gear or P gear to re-ignite. To prevent from overusing the battery power, the electronic devices inside the vehicle must also be turned off, which is inconvenient to the driver. FIG. 1 shows a conventional vehicle driving apparatus. As shown in FIG. 1, a conventional driving apparatus of a car is to install co-axially a first active transmission wheel 11 and a second active transmission wheel 12 on the crank shaft of engine 1. Active transmission wheel 11 uses a first transmission element 32 to couple a first passive transmission wheel 31 located at generator system 3. Active transmission wheel 12 uses a second transmission element 42 to couple with a passive transmission wheel 41 located at air-conditioning system 4. When the driver operates a first ignition switch 9A, battery 6 supplies power to engine ignition system 13 on engine 1 to start the engine. When the engine is in operation, the engine pulls first active transmission wheel 11 and second active transmission wheel 12. Therefore, whether the air-conditioner is in use or not, air-condition system 4 must be driven to rotate, and whether battery 6 is fully charged or not, engine 1 must pull generator system 3 to continue charging battery 6. Similarly, when the car must temporarily stop in traffic, the engine maintains the rotation in the idling so that the engine is overloaded, leading to the direct increase in fuel consumption and lowering the fuel efficiency.

SUMMARY OF THE INVENTION

The primary objective of the present invention is to provide an apparatus for automatically adjusting the engine load to save fuel consumption according to the actual operation condition of the related system included in the vehicle.

Another objective of the present invention is to provide an apparatus for combining with the idling turn-off system controlled by a circuit so that the vehicle can automatically turn off after long idle duration to save fuel consumption and conveniently re-start.

A primary feature of the present invention is to avoid fixing the first active transmission wheel and the second active transmission wheel to the crank shaft of the engine. Instead, a first clutch is placed between the crank shaft of the engine and the first active transmission wheel, and a second clutch is placed between the first active transmission wheel and the second active transmission wheel. Also, a control circuit is provided to control the operation of the first clutch and the second clutch, in order to control the driving and rotation of the first active transmission wheel and/or the second active transmission wheel. In addition, when the power stored in the battery is higher than a threshold and the air-conditioning system is not in use, the first clutch and the second clutch will not operate so that the engine can operate with a minimum load. When the power in the battery is detected to be lower than a threshold and the air-conditioning system is not in use, the first clutch is controlled to couple the first active transmission wheel to the crank shaft of the engine so that the engine will drive the generator to charge the battery. When the battery power is higher than a threshold and the air-conditioning system is in use, the first clutch will not operate but the second clutch is controlled to couple the first active transmission wheel with the second active transmission wheel so that the battery provides power to drive the rotation of the generator, and the first active transmission wheel and the second active transmission wheel drive the operation of the air-conditioning system. When the battery power is lower than a threshold and the air-conditioning system is in use, the first clutch and the second clutch are controlled to operate simultaneously so that the first clutch couples the first active transmission wheel with the crank shaft and the second clutch couples the first active transmission wheel with the second active transmission wheel. In this manner, when the engine operates, the generator charges the battery and the air-conditioning system also runs.

Another feature of the present invention is to combine an apparatus for controlling idling and turn-off based on the aforementioned apparatus. When the driver temporarily stops, the control circuit calculates the idling time and turns of the engine after the idling time reaching a threshold, while maintaining the electricity required by operating the other electronic devices inside the vehicle so as to save the fuel consumption. When the car is ready to go, an added second ignition switch or the first ignition switch can be used to re-ignite the engine.

Based on the above, the present invention couples a core axis moveably with the crank shaft of the engine. The moveable core axis includes a first active transmission wheel and a second active transmission wheel. The first active transmission wheel uses a first transmission element to couple with a passive transmission wheel on the generator system. The second active transmission wheel uses a second transmission element to couple with a second passive transmission wheel on the air-conditioning system. The engine includes an engine rotation speed detection system. The core axis includes a first clutch moveably installed between the first active transmission wheel and the crank shaft includes, and a second clutch moveably installed between the first active transmission wheel and the second active transmission wheel. The present invention further provides a control circuit electrically connected to the first clutch, the second clutch, the generator system, the engine rotation speed detection system, and the battery of the car. The control circuit, after receiving a signal, can control the first clutch and the second clutch to operate at the same or different time so that the crank shaft of the engine can engage or disengage the first active transmission wheel, and/or the first active transmission wheel can engage or disengage the second active transmission wheel. The control circuit also determines, according to the aforementioned signal, whether to provide electricity to the generator system to further drive the air-conditioning system.

The technique used by the present invention further includes, based on the aforementioned technique, to add a gear detection system and a second ignition switch, both electrically connected to the control circuit. When the gear detection system detects the car is in N or P gear, the control circuit starts to count the time and when the time reaches a threshold, the control circuit issues a turn-off command to the engine ignition system. Later on, the driver can use the second ignition switch or the original first ignition switch to re-ignite the engine. When the control circuit detects that the battery is lower than a threshold, the control circuit will automatically control the engine ignition system to start the engine.

The active transmission wheel, passive transmission wheel, and transmission element can be the belt wheel and the belt, or the chain wheel and chain commonly used in the car driving mechanism.

The aforementioned technique of the control circuit receiving a signal and generating controlling operation is that when the control circuit detects the battery is lower than a threshold, the power is provided from the battery to drive the generator system and when detecting that the rotation speed of the first active transmission wheel is close to the same as the rotation speed of the engine crank shaft, the control circuit controls the first clutch to engage the first active transmission wheel and the crank shaft and stops providing power to the generator system, and uses the engine to drive the generator system. When the control circuit detects the battery is higher than a threshold, the control circuit controls the first clutch to disengage the first active transmission wheel from the crank shaft, and control the battery to provide power to the generator system. When the power of air-conditioning system is connected and the control circuit detects that the battery is lower than a threshold, the control circuit automatically drives the first clutch and the second clutch so that the crank shaft and the first active transmission wheel are engaged, and the first active transmission wheel and the second active transmission wheel are also engaged. At this point, the engine provides power to drive the generator system and the air-conditioning system.

The present invention can further include an information display unit in front of the front seat electrically connected to the aforementioned control circuit so that the driver can see the battery power and other power consumption information from the information display unit.

The foregoing and other objectives, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENT

Figure 2:
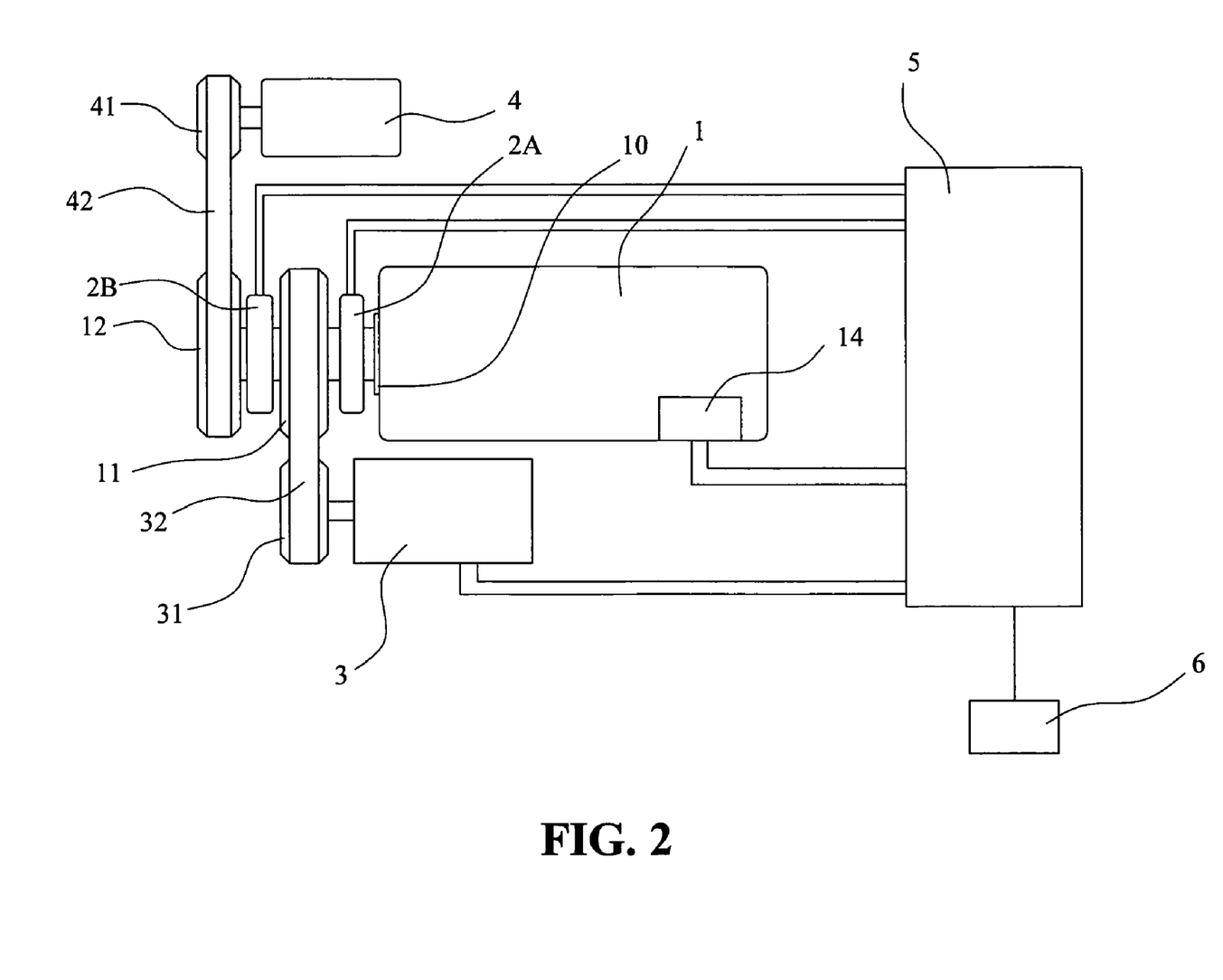
FIG. 2 shows a schematic view of a driving apparatus according to a first embodiment of the present invention.

FIG. 2 shows a driving apparatus for improving fuel efficiency according to a first embodiment of the present invention, including an engine 1, a generator system 3, an air-conditioning system 4, and a control circuit 5. The engine 1 is connected to the transmission system of a car for providing the driving force of the car. The engine 1 further includes an engine rotation speed detection system 14. The generator system 3 includes a first passive transmission wheel 31. The air-conditioning system 4 includes a second passive transmission system 41. A crank shaft 10 of the engine 1 is connected in a moveable manner to a core axis. The core axis includes a first active transmission wheel 11 and a second active transmission wheel 12 in a moveable manner. A first active transmission wheel 11 uses a first transmission element 32 to couple with a first passive transmission wheel 31 on the generator system 3, and a second active transmission wheel 12 uses a second transmission element 42 to couple with a second passive transmission wheel 41 on the air-conditioning system 4. The core axis further includes a moveable first clutch 2A between the first active transmission wheel 11 and the crank shaft 10, and a moveable second clutch 2B between the first active transmission wheel 11 and the second active transmission wheel 12. In the embodiment of the present invention, the first active transmission wheel 11, the second active transmission wheel 12, the first passive transmission wheel 31 and the second passive transmission wheel 41 can be a belt wheel commonly used in cars. The first transmission element 32 and the second transmission element 42 can be realized with the belt. Similarly, the first active transmission wheel 11, the second active transmission wheel 12, the first passive transmission wheel 31 and the second passive transmission wheel 41 can be a chain wheel commonly used in cars. The first transmission element 32 and the second transmission element 42 can be realized with the chain accordingly.

The control circuit 5 is electrically connected to the first clutch 2A, the second clutch 2B, the generator system 3, the engine rotation speed detection system 14 and a battery 6 of the car. The control circuit 5, after receiving a signal, can control the first clutch 2A and the second clutch 2B to operate at the same or different time so that the crank shaft 10 and the first active transmission wheel 11 can engage with or disengage from each other, and/or the first active transmission wheel 11 and the second active transmission wheel 12 can engage with or disengage from each other. The control circuit 5 also uses the aforementioned signal to determine whether the battery 6 can directly provide power to the drive generator system 3 to further drive the air-conditioning system 4.

In actual operation, the control circuit 5 will detect the power stored in the battery 6. If the power stored in the battery 6 is higher than a threshold and the air-conditioning system is not in use, the control circuit 5 will not drive the first clutch 2A and the second clutch 2B (as shown in FIG. 2). Therefore, the engine 1 will not drive the generator system 3 and the air-conditioning system 4 when the engine 1 operates so that the engine 1 operates in a lightly-loaded condition.

Figure 3:
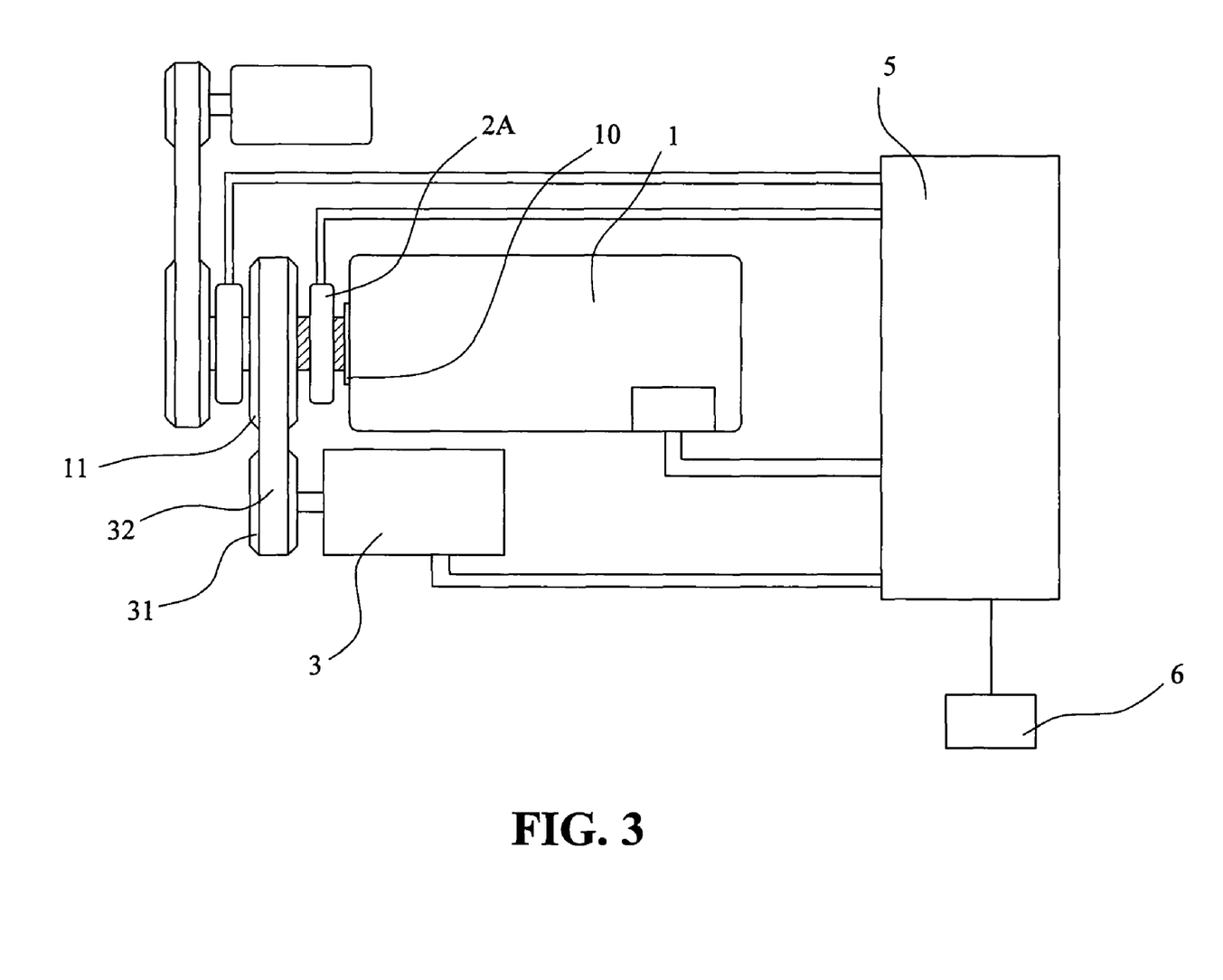
FIG. 3 shows a schematic view of the first clutch engaging the engine crank shaft and the first active transmission wheel according to the first embodiment of the present invention.

As shown in FIG. 3, when the control circuit 5 detects that the battery 6 is lower than a threshold (a first threshold), the control circuit 5 automatically provides power from the battery 6 to drive the generator system 3, and when detecting rotation speed of the first active transmission wheel 11 is close to or the same as the rotation speed of the engine crank shaft 10, the control circuit 5 makes the first clutch 2A to operate so that the first active transmission wheel 11 and the crank shaft 10 engage with each other and the battery stops providing power to the generator system 3. At this point, the engine 1 drives the generator system 3 to generate power to charge the battery 6. When the control circuit 5 detects that the battery 6 is higher than another threshold (a second threshold), the control circuit 5 automatically drive the first clutch 2A to make the first active transmission wheel disengage from the crank shaft 10. The engine 1 no longer drives the generator system 3 to operate, and the battery 6 starts to provide power to the generator system 3 again. These control operation activities are repeated continuously.

Figure 4:
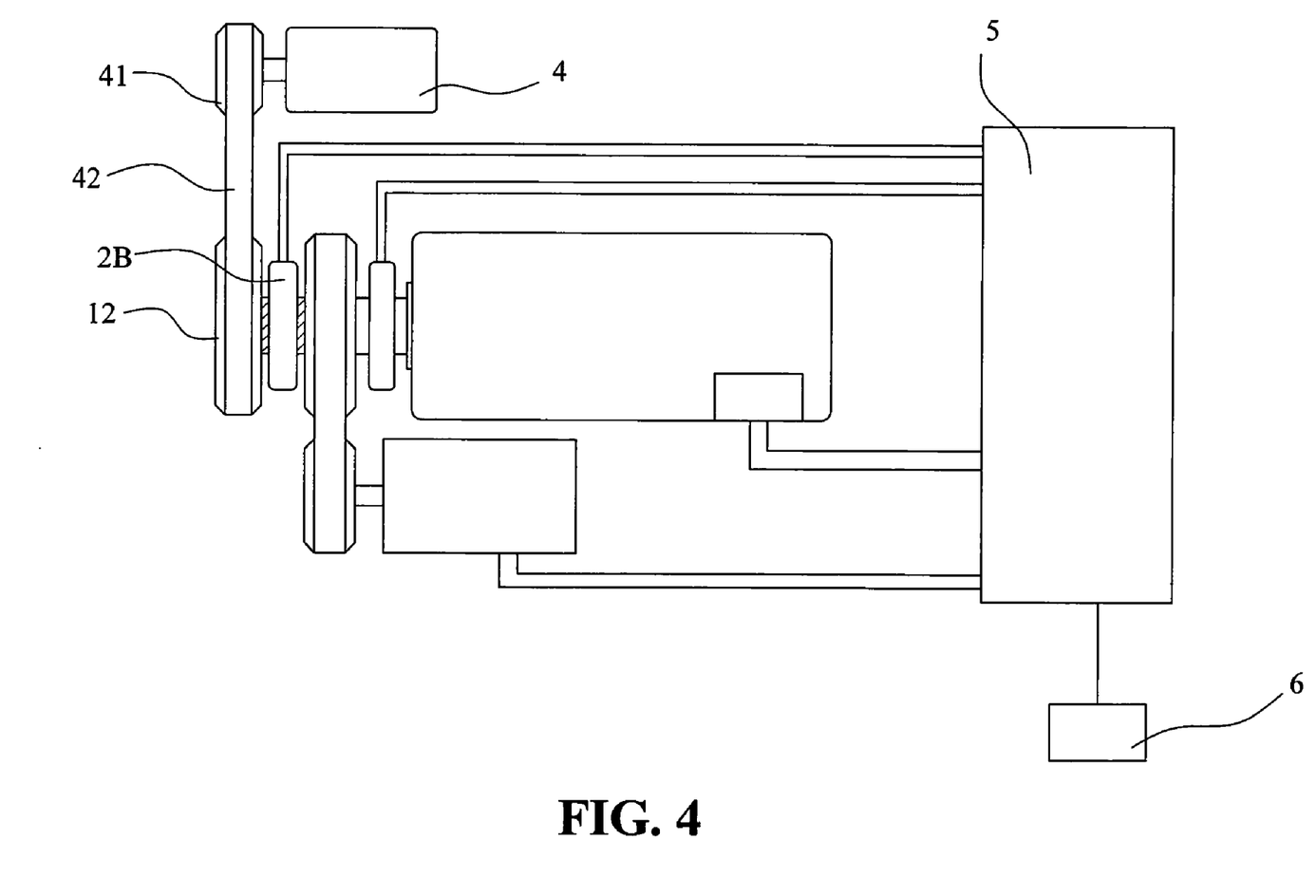
FIG. 4 shows a schematic view of the second clutch engaging the first active transmission wheel and the second active transmission wheel according to the first embodiment of the present invention.

As shown in FIG. 4, when the control circuit 5 detects that the power stored in the battery 6 is higher than a threshold (the first threshold) and the air-conditioner is in use, the first clutch 2A is not driven by the control circuit 5, instead, the control circuit 5 drives the second clutch 2B to engage the first active transmission wheel 11 and the second transmission wheel 12 with each other. At this point, the battery 6 provides power to operate the generator system 3 directly, and the first active transmission wheel 11 and the second active transmission wheel 12 drive the air-conditioning system 4 to operate. Until the power stored in the battery 6 is detected to be insufficient, the control circuit 5 still regulates the rotation speed of the generator system 3 driven by the battery 6 so that when the rotation speed of the first active transmission wheel 11 is close to or the same as the rotation speed of the crank shaft 10, the control circuit 5 drives the first clutch 2A to engage the first active transmission wheel 11 with the crank shaft 10. At this point, the engine 1 drives the generator system 3 to generate power to charge the batter 6. These control operation activities are repeated continuously.

Figure 5:
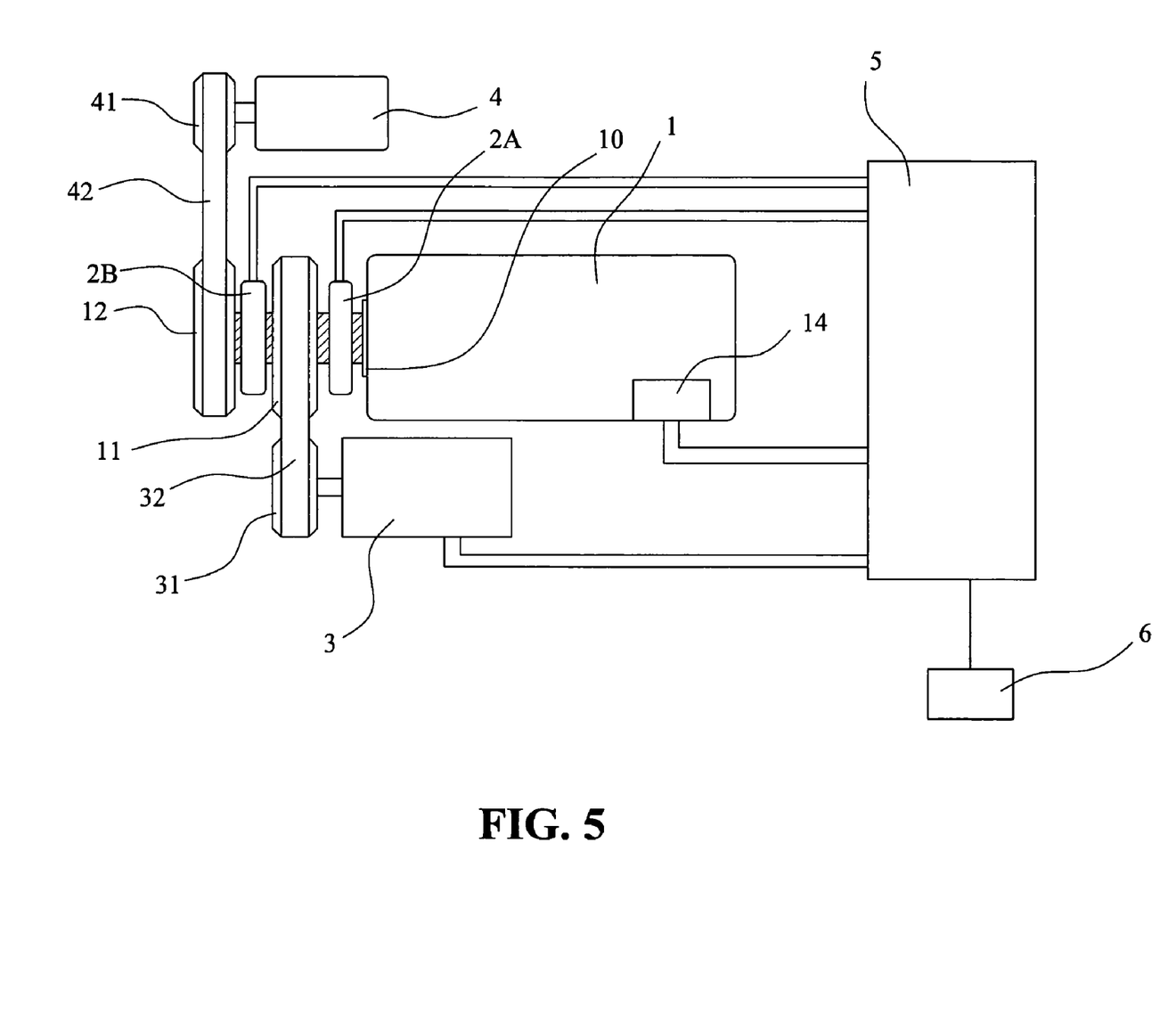
FIG. 5 shows a schematic view of the first clutch engaging the engine crank shaft and the first active transmission wheel, and the second clutch of the first embodiment engaging the second active transmission wheel and the second active transmission wheel according to the first embodiment of the present invention.
Figure 6:
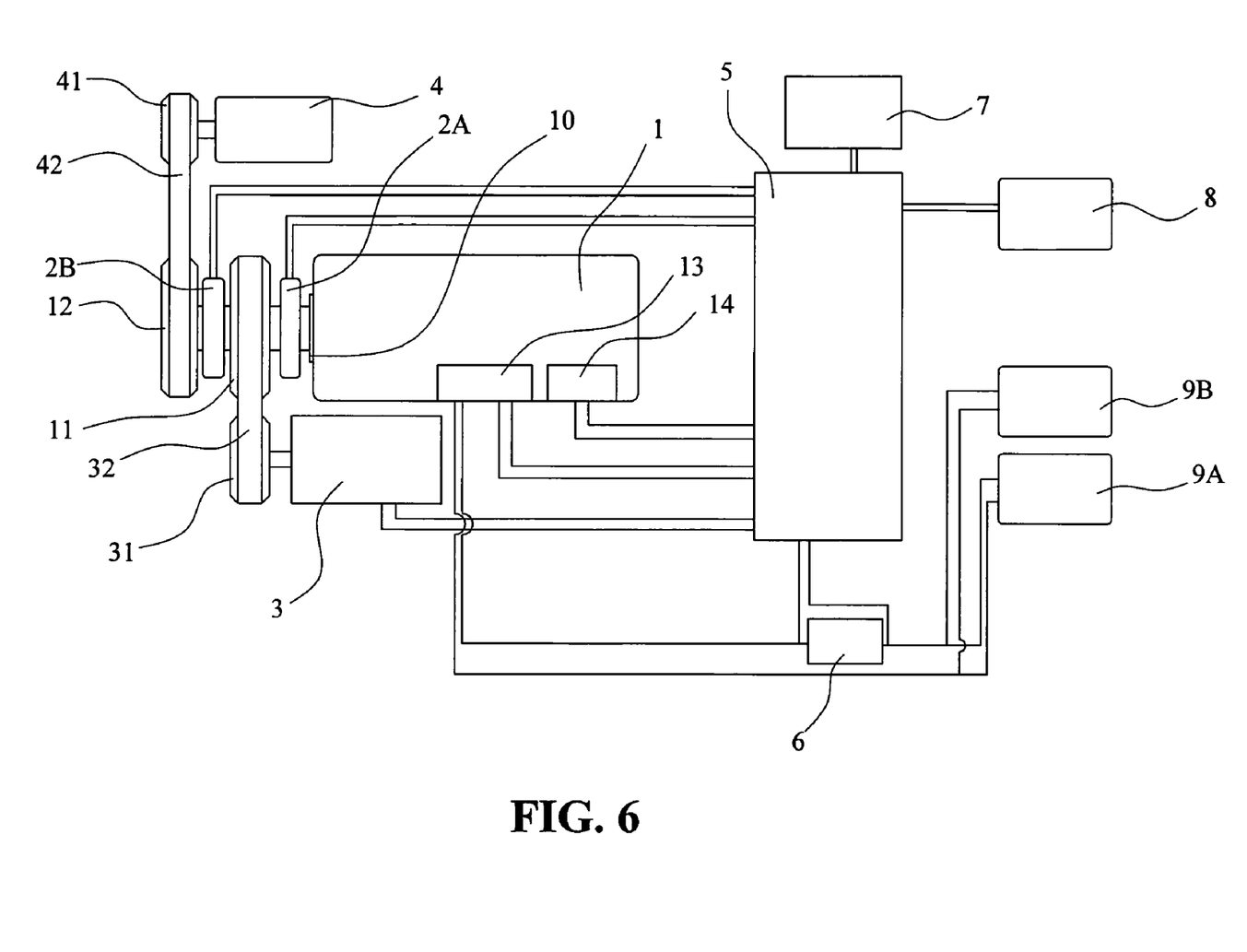
FIG. 6 shows a schematic view of the second embodiment of the present invention.
Figure 7:
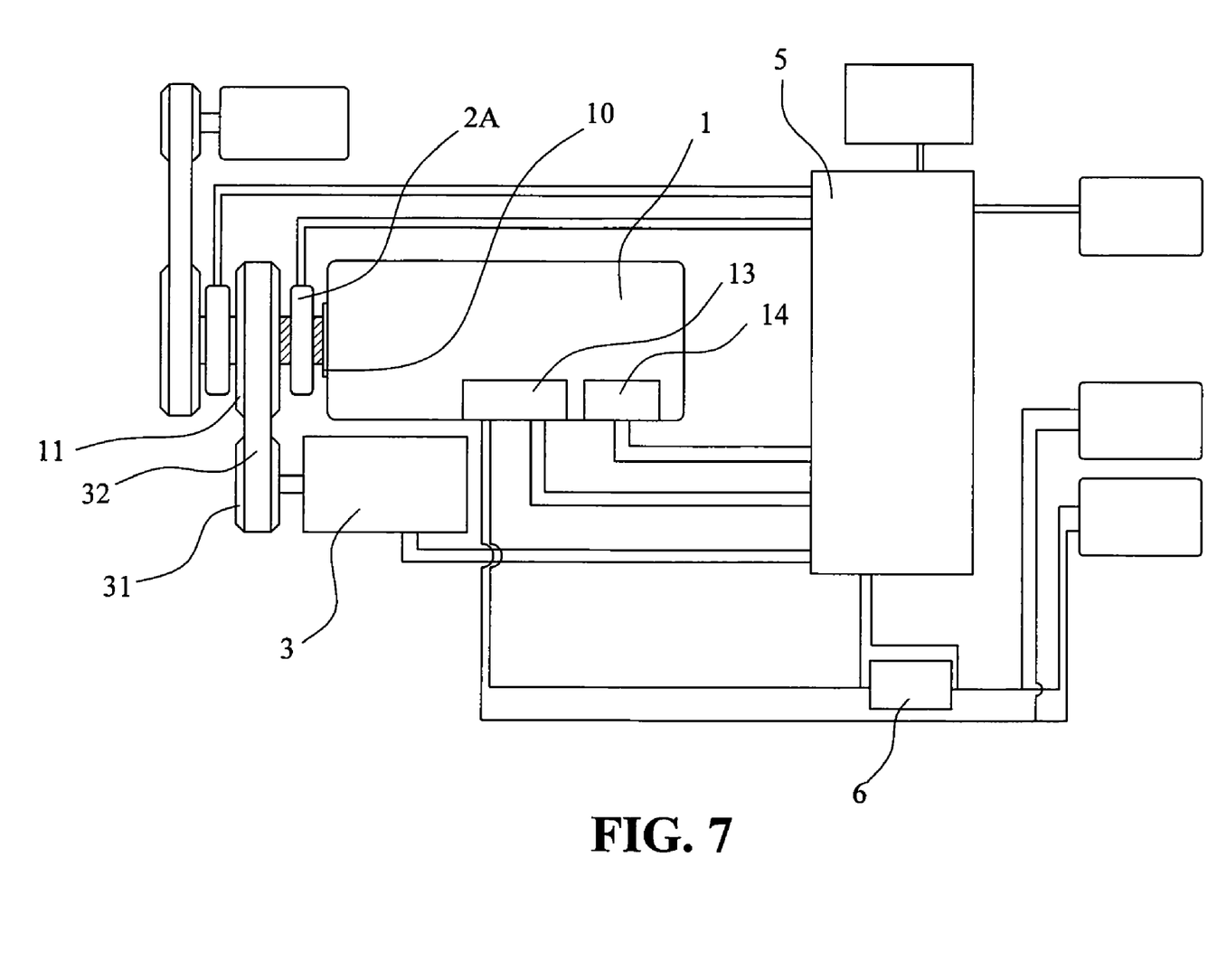
FIG. 7 shows a schematic view of the first clutch engaging the engine crank shaft and the first active transmission wheel according to the second embodiment of the present invention.
Figure 8:
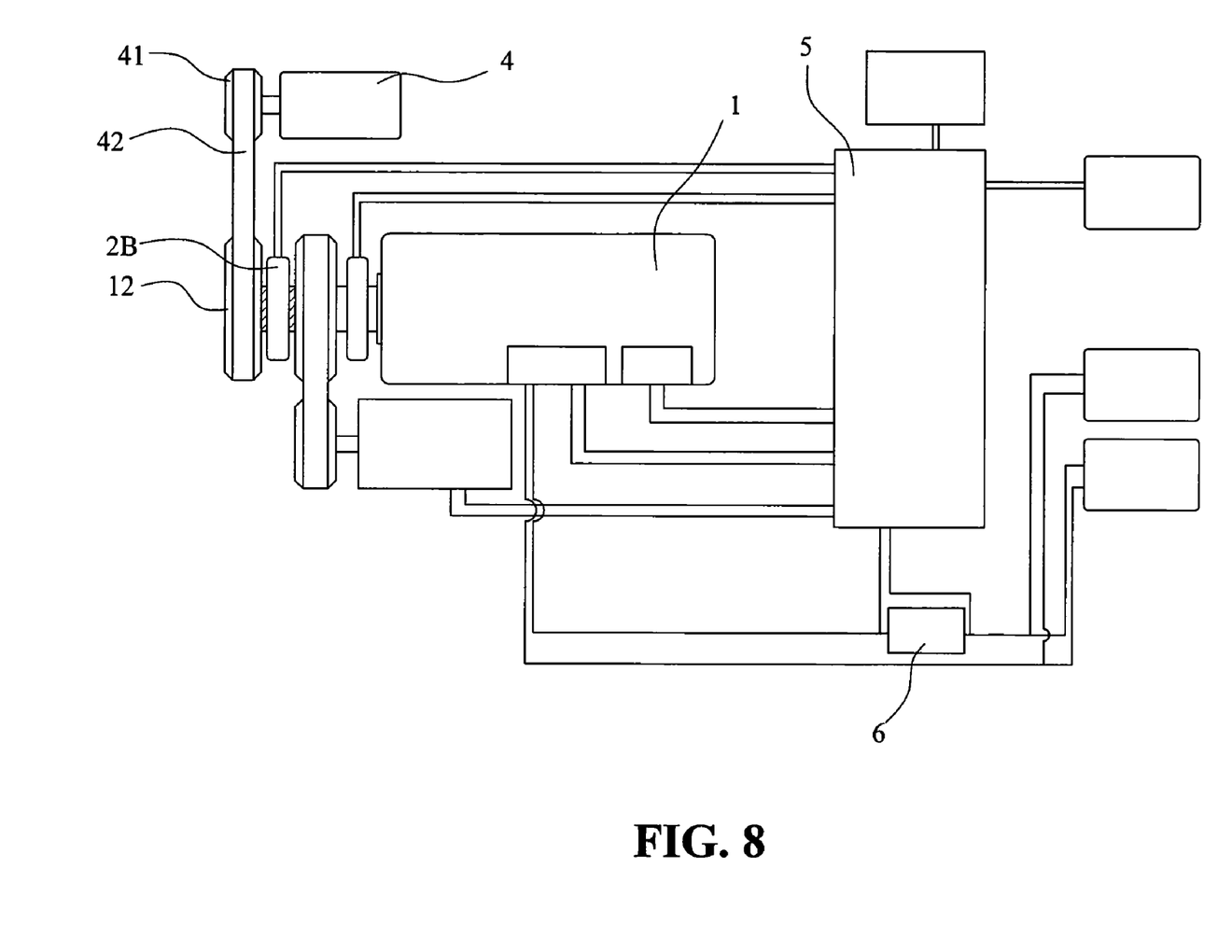
FIG. 8 shows a schematic view of the second clutch engaging the first active transmission wheel and the second active transmission wheel according to the second embodiment of the present invention.
Figure 9:
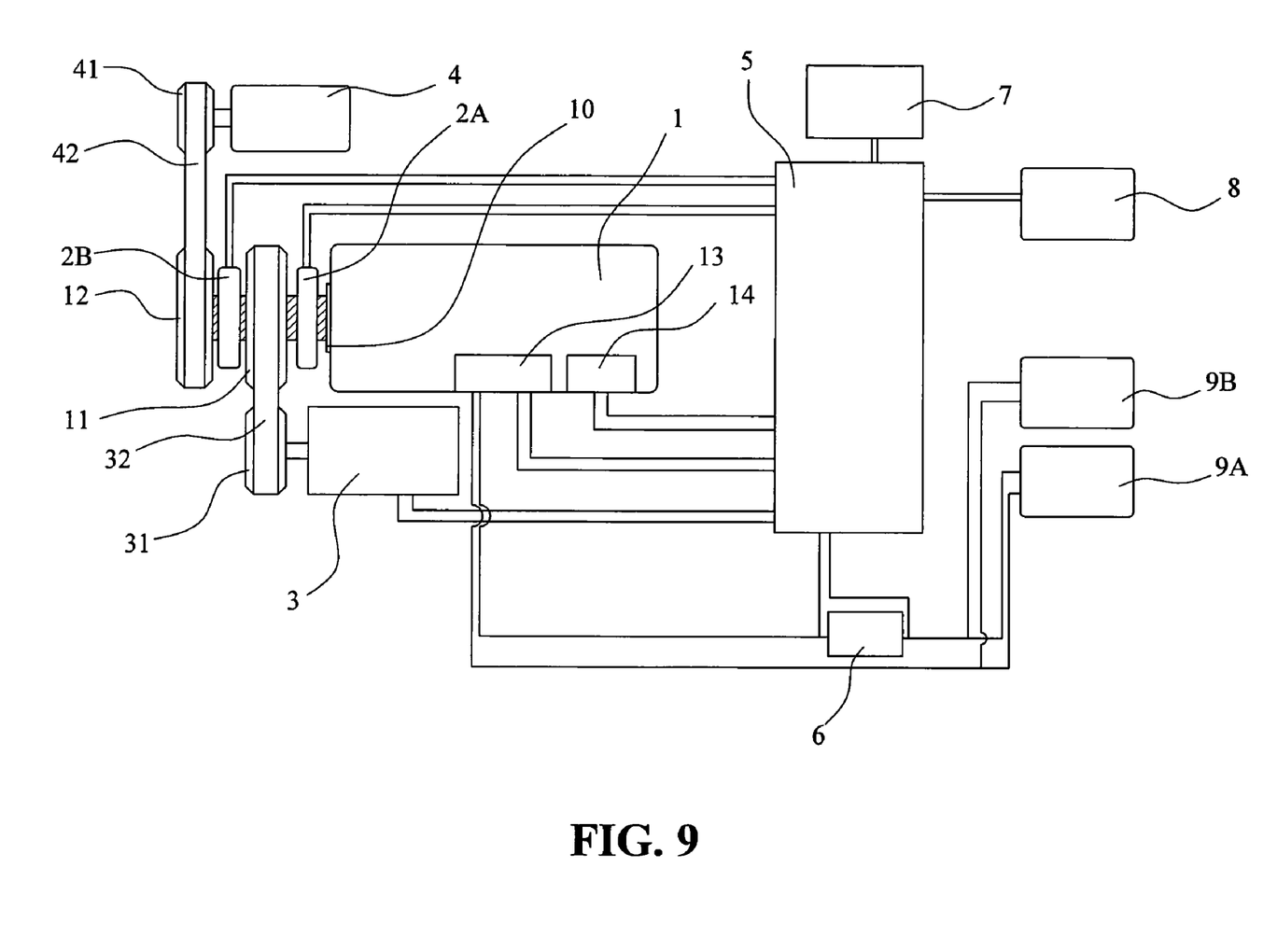
FIG. 9 shows a schematic view of the first clutch engaging the engine crank shaft and the first active transmission wheel, and the second clutch of the second embodiment engaging the second active transmission wheel and the second active transmission wheel according to the second embodiment of the present invention.

As shown in FIG. 5, when the control circuit 5 detects that the power stored in the battery 6 is lower than a threshold (the first threshold), it drives the generator system 3 to generate power to charge the battery 6. If the stored power is lower than another threshold (the second threshold) and the air-conditioner is in use, the control circuit 5 changes the first clutch 2A from engaging to disengaging, and drives the second clutch 2B to engage. The control circuit 5 makes the battery 6 provide power to the generator system 3 and regulates the rotation speed so that when the rotation speed of the first active transmission wheel 11 is close to or the same as the rotation speed of the crank shaft 10, the control circuit 5 drives the first clutch 2A to engage the first active transmission wheel 11 with the crank shaft 10. This process eliminates the unsmoothness caused by the different system angular speeds when the engine operates, the air-conditioner is turned on and the generator must generate power. Afterwards, the control circuit 5 drives the first clutch 2A and the second clutch 2B to operate simultaneously so that the first transmission wheel 11 is engaged with the crank shaft 10 and the second active transmission wheel 12 is engaged with the first active transmission wheel 11. In this manner, the engine 1 operates, drives the generator system 3 to generate power to charge the battery 6, and drives the air-conditioning system 4 to operate. Until the power stored in the battery 6 is detected to be higher than the second threshold, the control circuit 5 automatically drives the first clutch 2A to disengage the first active transmission wheel 11 from the crank shaft 10, and the battery 6 starts to provide power to drive the generator system 3 and the air-conditioning system 4. These control operation activities are repeated continuously.

FIGS. 6-9 show another embodiment of the present invention. In addition to the embodiment of FIG. 2, the apparatus of the present invention may further include a gear detection system 7, an additional second ignition switch 9B, an original first ignition switch 9A, an engine ignition system 13 on the engine 1, and an information display unit 8, all electrically connected to the control circuit 5. During traveling, when the gear detection system 7 detects that the driver shifts gear box into N or P gear, the control circuit 5 starts to count the time, and when the time reaches a threshold, the control circuit 5 issues a turn-off command to the engine ignition system 13, while maintaining providing power to other electrical devices inside the vehicle. The engine stops operating to save the fuel consumption, and the control circuit 5 monitors the remaining power in the battery 6. When the battery 6 is lower than a threshold (first threshold), the control circuit 5 will start the engine ignition system 13 to ignite the engine 1. To resume traveling, if the engine is still turned off, the driver must use the first ignition switch 9A or the second ignition switch 9B to start the engine ignition system 13 to ignite the engine 1. The additional second ignition switch 9B is provided for the convenience of the driver, and can be located on the suitable position on the gear stick for easy press.

The information display unit 8 can be installed on the dashboard so that the driver can see the information of battery and related power consumption. The information display unit 8 can display the power consumption in a unit time, the charging power of the generator, the remaining power time computed by the battery power and the power consumption when the generator stops charging, and so on.

In summary, the present invention is to reduce the dependence of compressor and generator on the engine so as to lower the load on the engine to achieve the objective of fuel consumption as well as improve the fuel efficiency.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for improving fuel efficiency of a vehicle, comprising:
   an engine, having a crank shaft, the crank shaft connected to a core axis in a moveable manner, the core axis having a first active transmission wheel and a second active transmission wheel in a moveable manner, the engine having an engine rotation speed detection system;
   a first clutch, located moveably on the core axis between the first active transmission wheel and the engine crank shaft;
   a second clutch, located moveably on the core axis between the first active transmission wheel and the second active transmission wheel;
   a generator system, connected to a first passive transmission wheel, the first passive transmission wheel connected to the first active transmission wheel through a first transmission element;
   an air-conditioning system, connected to a second passive transmission wheel, the second passive transmission wheel connected to the second active transmission wheel through a second transmission element;
   a control circuit, electrically connected to the first clutch, the second clutch, the generator system, the engine rotation speed detection system of the engine; and
   a battery, electrically connected to the control circuit;
   wherein when the control circuit receives a signal, the control circuit is able to control the first clutch and the second clutch to operate at the same or different time so as to make the engine crank shaft and the first active transmission wheel engaging with or disengaging from each other, and/or make the first active transmission wheel and the second active transmission wheel engaging with or disengaging from each other, the control circuit also determining according to the signal whether to provide power directly to operate the generator system to drive the air-conditioning system.

2. The apparatus as claimed in claim 1, further comprising:
   a gear detection system, an engine ignition system and a second ignition switch, all electrically connected to the control circuit;
   wherein the second ignition switch also electrically connected to the battery, when the gear detection system detecting the vehicle in N or P gear, the control circuit starting to count time, when time reaching a threshold, the control circuit issuing a turn-off command to the engine ignition system, operating the second ignition switch to start the engine ignition system to re-ignite the engine, when the control circuit detecting power stored in the battery is lower than a threshold, the control circuit automatically starting the engine ignition system to re-ignite the engine.

3. The apparatus as claimed in claim 1, wherein the first active transmission wheel and the first passive transmission wheel are both belt wheels and the first transmission element is a belt.

4. The apparatus as claimed in claim 2, wherein the first active transmission wheel and the first passive transmission wheel are both belt wheels and the first transmission element is a belt.

5. The apparatus as claimed in claim 1, wherein the second active transmission wheel and the second passive transmission wheel are both belt wheels and the second transmission element is a belt.

6. The apparatus as claimed in claim 2, wherein the second active transmission wheel and the second passive transmission wheel are both belt wheels and the second transmission element is a belt.

7. The apparatus as claimed in claim 1, wherein the first active transmission wheel and the first passive transmission wheel are both chain wheels and the first transmission element is a chain.

8. The apparatus as claimed in claim 2, wherein the first active transmission wheel and the first passive transmission wheel are both chain wheels and the first transmission element is a chain.

9. The apparatus as claimed in claim 1, wherein the second active transmission wheel and the second passive transmission wheel are both chain wheels and the second transmission element is a chain.

10. The apparatus as claimed in claim 2, wherein the second active transmission wheel and the second passive transmission wheel are both chain wheels and the second transmission element is a chain.

11. The apparatus as claimed in claim 1, wherein when the control circuit detects that power stored in the battery is lower than a threshold, the control circuit automatically makes the battery provide power to drive the generator system, and when the control circuit detects rotation speed of the first active transmission wheel close to or the same as rotation speed of the crank shaft, the battery stops providing power to the generator system and the engine drives the generator system to operate, when the controlling circuit detecting power stored in the battery is higher than a threshold, the control circuit automatically controls the first clutch to disengage the first active transmission wheel from the crank shaft and the battery starts to provide power to the generator system.

12. The apparatus as claimed in claim 11, wherein when the air-conditioning system is on, and the control circuit detects that power stored in the battery is lower than a threshold, the control circuit automatically enables the second clutch to engage the first active transmission wheel and the second active transmission wheel with each other, and the engine drives the air-conditioning system.

13. The apparatus as claimed in claim 1, wherein the control circuit is further electrically connected to an information display unit.

14. The apparatus as claimed in claim 2, wherein the control circuit is further electrically connected to an information display unit.

15. The apparatus as claimed in claim 13, wherein the information display unit displays information of power consumption per unit time, charging power of the generator system, remaining power time calculated according to battery power and power consumption per unit time when the generator stops charging.

16. The apparatus as claimed in claim 14, wherein the information display unit displays information of power consumption per unit time, charging power of the generator system, remaining power time calculated according to battery power and power consumption per unit time when the generator stops charging.

* * * * *